United States Patent Office 3,370,079
Patented Feb. 20, 1968

3,370,079
4-ISOPROPYL-DIPHENYL-AMINE-N-CARBOXYLIC ACID β-(DIMETHYLAMINO)PROPYL THIOESTER
Ulrich Hörlein, Wuppertal-Vohwinkel, Ludwig Eue, Cologne-Stammheim, Helmuth Hack, Opladen, and Klaus-Heinz Risse, Solingen-Wald, Germany, assignors to Farbenfabriken Bayer Aktiengesellschaft, Leverkusen, Germany, a corporation of Germany
No Drawing. Filed Feb. 18, 1965, Ser. No. 433,771
Claims priority, application Germany, Feb. 25, 1964, F 42,123
1 Claim. (Cl. 260—455)

The present invention concerns the application of particular carbamic acid thioesters, some of which are known, as agents for the control of water plants.

It has already been disclosed that it is for instance possible to employ 1,1-ethylene-2,2-dipyridylium dibromide for the control of water plants (see Weed Control Handbook, 3rd edition, 1963, page 205). This is a particularly active agent.

No compounds from the group composed of the carbamic acid thioesters have hitherto been suggested for the control of water plants.

It is an object of the present invention to provide particular carbamic acid thioesters as agents for the control of water plants.

It is another object of the present invention to provide certain novel carbamic acid thioesters and a method for the preparation thereof.

It is still another object of the present invention to provide for the controlled destruction of water plants.

It is still another object of the present invention to provide phytotoxic preparations or herbicidal preparations comprising a carrier vehicle in admixture with a particular carbamic acid thioester of the instant type possessing valuable phytotoxic and/or herbicidal properties.

It is a still further object of the present invention to provide compositions of carrier materials and carbamic acid thioesters of the intsant type with such thioesters being present in sufficient quantity to destroy water plants.

It is a still further object of the present invention to provide a method of destroying water plants which includes introducing into their vicinal waters a phytotoxic and/or a phytocidal and/or herbicidal amount of a particular carbamic acid thioester of the instant type.

Other and further objects of the present invention will become apparent from a study of the within specification and accompanying examples.

It has been found in accordance with the present invention that the thioesters of carbamic acid of the following formula, some of which are known,

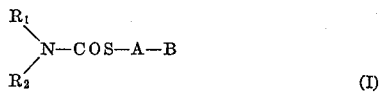

(I)

wherein $R_1$ and $R_2$ denote alkyl, cycloalkyl, pyridyl or, optionally substituted, phenyl, A denotes alkylene, and B denotes an amino group substituted by alkyl and/or by cycloalkyl or a saturated 5–6 membered heterocyclic radical containing nitrogen, which is linked to the radical A by a carbon-carbon bond or a carbon-nitrogen bond, exhibit properties which strongly influence in a toxic manner the growth of water plants, and in particular of submerged water plants.

The fact that the carbamic acid thioesters should have properties which strongly influence the growth of water plants, i.e., in the sense that such thioesters are phytotoxic or herbicidal, must be regarded as distinctly surprising, because it had not previously been known that compounds of this type have any herbicidal properties at all and in particular because the carbamic acid thioesters to be employed in accordance with the invention only exert weak herbicidal activity upon plants growing on land. It is especially surprising that the compounds to be employed in accordance with the invention should have a stronger herbicidal activity towards water plants than the best active agents known for the same purpose. The superiority of the compounds to be employed according to the invention is particularly evident from the examples set forth hereinafter. The agents according to the present invention represent a valuable addition to the herbicidal art.

The carbamic acid thioesters to be employed according to the instant invention are clearly characterized by the above specified Formula I. In this formula, $R_1$ and $R_2$ preferably represent alkyl with 1 to 6 carbon atoms, cycloalkyl with 5 to 6 carbon atoms, pyridyl and also phenyl, which is preferably substituted by halogen such as chlorine and bromine, and/or by alkyl with 1 to 4 carbon atoms and/or by alkoxy with 1 to 4 carbon atoms; A preferably represents straight or branched alkylene bridges with 1 to 4 carbon atoms; and B preferably represents amino groups di-substituted by alkyl with 1 to 6 carbon atoms or by cycloalkyl with 5 to 6 carbon atoms. In addition, B may represent saturated 5–6 membered radicals containing nitrogen which optionally also contain other heteroatoms in addition to nitrogen, such as oxygen or sulfur, and which are linked either via a ring nitrogen atom or a ring carbon atom to such alkylene bridge. The heterocyclic radicals are preferably derived from pyrrolidine, piperidine, piperazine, morpholine and hexamethylene-imine.

The following may be mentioned in detail as examples in accordance with the present invention of the carbamic acid thioesters which may be considered as typically suitable:

4-isopropyl-diphenylamine-N-carboxylic acid β-dimethylamino-propyl thioester,
4-isopropyl-diphenylamine-N-carboxylic acid β-(1'-piperidyl)-propyl thioester,
4-isopropyl-diphenylamine-N-carboxylic acid β-diethylamino-ethyl thioester,
2- and 4-chloro-diphenylamine-N-carboxylic acid β-diethylamino-ethyl thioester,
4-methyl-diphenylamine-N-carboxylic acid β-diethylamino-ethyl thioester,
2-methyl-diphenylamine-N-carboxylic acid β-diethylamino-ethyl thioester, 4-methoxy-diphenylamine-N-carboxylic acid β-diethyl-
  amino-ethyl thioester,
Diphenylamine-N-carboxylic acid β-dibutylamino-ethyl
  thioester, and
Diphenylamine-N-carboxylic acid β-(1'-methyl-piperidyl-
  2')-ethyl thioester.

The majority of the carbamic acid thioesters to be employed according to the present invention are know (see, for instance, German Patent Nos. 1,136,693, 1,150,379 and 1,150,380, and also U.S. Patent Nos. 2,642,450 and 2,642,451). The carbamic acid thioesters contemplated by the present invention which were heretofore unknown may be prepared according to methods similar to those employed for the known carbamic acid thioesters, for instance by reacting the corresponding amine with phosgene during a first stage at temperatures between 30 and 150° C. in the presence of an inert solvent so as to form the corresponding carbamic acid chloride and by reacting the latter with a basic substituted alkylmercaptan during a second stage at temperatures between 30 and 150° C. in the presence of an inert solvent. An example is set forth hereinbelow for the preparation of a novel carbamic acid thioester of the instant type (cf. the above stated German patents for the methods of preparation).

Significantly, the compounds according to the present invention exhibit a relatively low toxicity toward warm blooded creatures and toward fish and at the same time exert a strong adverse effect on water plants, so that they are consequently suitable as phytotoxic or phytocidal agents for the control of water weeds. The term "water weeds" is used herein in its widest sense to denote all water plants which grow in water at places where they are not desired.

The water plants include, for example, monocotyledons such as *Elodea densa, Najas guadalupensis, Potamogenton spec., Lemna minor, Spirodelia spec.* and *Vallisneria spiralis,* as well as dicotyledons such as *Ceratophyllum demersum* and *Myriophyllum brasiliensis.*

The compounds according to the present invention are phytotoxically and/or phytocidally active not only in stagnant waters but also in moving waters. A short period of contact causes sufficiently strong damage to a plant to kill it.

The compounds according to the instant invention can be utilized, if desired, in the form of the usual formulations or compositions with dispersible carrier vehicles, such as emulsifiable concentrates, spray powders, pastes, soluble powders, dusting agents and granulates. These are prepared in known manner, for instance by extending the active agents with solvents and/or dispersible solid carriers, optionally by the use of emulsifying agents and/or dispersing agents (cf. Agricultural Chemicals, March 1960, pages 35–38). The following may be mainly considered for use as carrier vehicles or assistants for this purpose: solvents such as aromatic hydrocarbons (for instance benzene, toluene, xylene, etc.), chlorinated aromatic hydrocarbons (for instance chlorobenzenes), paraffins (for instance petroleum fractions), alcohols (for instance methanol, ethanol, butanol, etc.), amines (for instance ethanolamine, dimethyl formamide, etc.), ketones (for instance acetone), and water; finely divided solid carriers such as natural ground minerals (for instance kaolins, alumina, chalk, i.e., calcium carbonate, talc, etc.), and synthetic ground minerals (for instance highly dispersed silicic acid, silicates, e.g., alkali silicates, etc.); emulsifying agents such as non-ionic and anionic emulsifying agents (for instance polyethylene oxide esters of fatty acids, polyethylene oxide ethers of fatty alcohols, alkyl sulfonates, aryl sulfonates, etc., and especially alkyl aryl-polyglycol ether); and dispersing agents such as lignin, sulfite waste liquors, methyl cellulose, etc.

The active agents or compounds according to the instant invention may be present in the compositions in the form of mixtures with other known active agents.

In general, the compositions or formulations contain substantially between about 0.1 and 95 percent by weight of the active agent, and preferably substantially between about 0.5 and 90 percent by weight.

The carbamic acid thioesters to be employed according to the invention may be applied by themselves, in the form of salts, in the form of their compositions, for example with carrier vehicles, or in the form of particular dosage preparations for specific application made therefrom. Their application to the water plants is carried out by the usual method, for instance by sprinkling or spraying the compounds per se or their compositions onto the surface of the water containing the plants to be destroyed.

The amount of active agent, i.e., compound, to be applied depends on the amount of water to be treated. In addition to its surface area, consideration must also be given to the depth of the water. The rate of flow also plays a part in the case of moving waters. In every case, it is necessary to achieve a certain concentration of the active agent during a definite period of time so that the intensity of the damage to the water plants is sufficient for their destruction.

The proportions of active agent, i.e., compound of the instant type, may vary within fairly wide limits and preferably range substantially between about 0.1–100 p.p.m. (i.e., 0.1–100 parts by weight per million parts by weight of the water being treated in the area surrounding the plants).

The following examples are given for the purpose of illustration, and not limitation, of the present invention:

EXAMPLE 1

*Test on water plants in stagnant waters*

Solvent: 10 parts by weight of acetone.
Emulsifying agent: 5 parts by weight of alkylaryl polyglycol ether.

In order to prepare a suitable composition of the active agent, 1 part by weight of the active agent is mixed with the specified amount of solvent, the specified amount of the emulsifying agent is then added, and the concentrate is subsequently diluted with water to give the desired final concentration of the formulation.

Water plants are planted in a large vessel which has a floor covered with soil and which is filled with tap water. The plants remain in this vessel without treatment for about 3 weeks in order to become acclimatized. The composition of the active agent is thereafter sprinkled onto the surface of the water and the water then is stirred. In this connection, the concentration of the active agent in the composition is immaterial, and the amount of active agent per unit volume of water in the vessel is solely decisive.

After they have remained in the treated water for a definite period of time, the degree of damage to the plants is estimated by the use of the following characteristic indices:

0—no damage
1—individual leaves are dying
2—⅓ of the plant has died
3—½ of the plant has died
4—plants are dying but still green
4.5—only a few individual green parts remain
5—plant is completely dead The active agents, concentrations of the active agents, water plants, periods of treatment time with the active agent, and degrees of damage are evident from Table I which follows:

Table I.—Test on water plants in stagnant waters

| Active Agent | Concentration of active agent in p.p.m. | Degree of damage after remaining for 5 weeks | | | | |
|---|---|---|---|---|---|---|
| | | Elodea densa | Najas guadalupensis | Ceratophyllum demersum | Potamogeton spec. | Lemna minor |
| (A) [diphenylamine derivative with —CH(CH₃)₂, CO—S—CH(CH₃)—CH₂—N(CH₃)₂] as the fumarate | 5<br>2.5<br>1 | 5<br>4<br>3 | 5<br>5<br>2 | 5<br>5<br>3 | 5<br>5<br>5 | 5<br>5<br>5 |
| (B) 1,1-ethylene-2,2-dipyridylium dibromide (known). | 5<br>2.5<br>1 | 4.5<br>4.5<br>3 | 5<br>4<br>3 | 4<br>4<br>3 | 4<br>4<br>2.5 | 5<br>5<br>5 |

| Active Agent | Concentration of active agent in p.p.m. | Degree of damage after remaining for 3 weeks | | |
|---|---|---|---|---|
| | | Elodea densa | Myriophyllum brasiliensis | Vallisneria spiralis |
| (C) $(C_4H_9)_2N-CO-S-CH(CH_3)-CH_2-N(CH_3)_2 \cdot HCl$ | 5<br>2.5<br>1.25 | 2<br>2<br>0 | 5<br>5<br>3 | 5<br>0<br>0 |
| (D) $(C_4H_9)_2N-CO-S-CH_2-CH_2-N(C_2H_5)_2 \cdot HCl$ | 5<br>2.5<br>1.25 | 5<br>0<br>0 | 5<br>5<br>2 | 5<br>0<br>0 |
| (E) $(C_6H_5)_2N-CO-S-CH_2-CH_2-$ (piperidine)·HCl | 5<br>2.5<br>1.25 | 5<br>0<br>0 | 5<br>5<br>4 | 5<br>0<br>0 |
| (F) $C_6H_5-N(CH_3)-CO-S-CH(CH_3)-CH_2-N(CH_3)_2 \cdot HCl$ | 5<br>2.5<br>1.25 | 2<br>0<br>0 | 5<br>5<br>5 | 5<br>0<br>0 |

EXAMPLE 2

*Test on water plants with change of water*

Solvent: 10 parts by weight of acetone.
Emulsifying agent: 5 parts by weight of alkylaryl polyglycol ether.

In order to prepare a suitable composition of the active agent, 1 part by weight of the active agent is mixed with the specified amount of solvent, the specified amount of the emulsifying agent is then added, and the concentrate is subsequently diluted with water to give the desired final concentration of the formulation.

A vessel is filled with the diluted composition of the active agent and the water plants are thereafter introduced thereinto. After they have remained in the aqueous composition of the active agent for a given period of time, the water plants are taken out again and transferred to a vessel containing only tap water.

The degree of damage to the water plants is estimated 3 weeks after the transfer by the use of the following characteristic indices:

0—no damage
1—individual leaves are dying
2—⅓ of the plant has died
3—½ of the plant has died
4—plants are dying but still green
4.5—only a few individual green parts remain
5—plant is completely dead The active agent, concentrations of the active agent, water plants, periods of treatment time with the active agent, and degrees of damage are evident from Table II which follows:

TABLE II.—TEST ON WATER PLANTS WITH CHANGE OF WATER

| Active Agent | Concentration of active agent in p.p.m. | Degree of damage after remaining for the following periods of time (hours): | | | | | | | | |
|---|---|---|---|---|---|---|---|---|---|---|
| | | Elodea densa | | | Myriophyllum brasiliensis | | | Vallisneria spiralis | | |
| | | 8 | 4 | 2 | 8 | 4 | 2 | 8 | 4 | 2 |
| (A') [diphenylamine derivative with —CH(CH₃)₂, CO—S—CH(CH₃)—CH₂—N(CH₃)₂] as the fumarate | 50<br>10<br>5 | 5<br>5<br>5 | 5<br>5<br>5 | 5<br>5<br>2 | 5<br>5<br>5 | 5<br>5<br>5 | 5<br>5<br>2 | 5<br>5<br>5 | 5<br>4.5<br>4.5 | 5<br>4.5<br>1 |

EXAMPLE 3

The preparation of the compounds to be employed may be carried out by a method analogous to that described below for preparing 4-isopropyl-diphenylamine-N-carboxylic acid β-diamethylamino-propyl thioester.

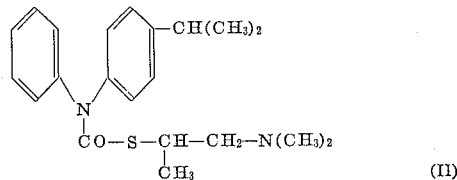

(II)

Phosgene is passed for 13 hours into a boiling solution of 527.5 g. of 4-isopropyl-diphenylamine (M.P. 73° C.) in 3.6 liters of xylene. The solution is thereafter evaporated somewhat at an external temperature of 100° C. in order to remove excess of phosgene. Then fresh xylene is added to restore the original volume, and thereafter a mixture of 325 g. of β-dimethylaminopropyl-mercaptan, 262.5 g. of triethylamine, and 500 ml. of xylene is added dropwise at 100° C., and the resulting mixture of ingredients is allowed to react at this temperature for another 15 hours. After cooling, the triethylamine hydrochloride formed is filtered off with suction, the xylene solution is washed with water, the resultant base is extracted with dilute acid and the aqueous acidic solution produced is rendered alkaline again. After the mixture has been extracted with ether, the ether extract dried over potassium carbonate and filtered, and the ether solution evaporated, distillation of the residue from evaporation produces 806.6 g. of 4-isopropyl-diphenylamine-N-carboxylic acid β-dimethylamino-propyl thioester of B.P. 150–160° C./0.01 mm. Hg, whose fumarate melts at 151–153.5° C.

EXAMPLE 4

In a manner analogous to the preparation of 4-isopropyl-diphenylamine - N - carboxylic acid β-(dimethylamino) propyl thioester, the following carbamic acid thioesters may be formed:

4-isopropyl-diphenylamine-N-carboxylic acid α-methyl-β-(dimethylamino) ethyl thioester;
Dibutylamine-N-carboxylic acid α-methyl-β-(dimethylamino) ethyl thioester;
Dibutylamine-N-carboxylic acid β-(diethylamino) ethyl thioester;
Diphenylamine-N-carboxylic acid β-(piperidyl) ethyl thioester;
N-methyl-N-phenylamine-N-carboxylic acid α-methyl-β-(dimethylamino) ethyl thioester;
4-isopropyl-diphenylamine-N-carboxylic acid β-(1'-piperidyl) propyl thioester;
4-isopropyl-diphenylamine-N-carboxylic acid β-(diethylamino) ethyl thioester;
4-chloro-diphenylamine-N-carboxylic acid β-(diethylamino) ethyl thioester;
2-chloro-diphenylamine-N-carboxylic acid β-(diethylamino) ethyl thioester;
4-methyl-diphenylamine-N-carboxylic acid β-(diethylamino) ethyl thioester;
2-methyl-diphenylamine-N-carboxylic acid β-(diethylamino) ethyl thioester;
4 - methoxy - diphenylamine - N - carboxylic acid β-(diethylamino) ethyl thioester;
Diphenylamine-N-carboxylic acid β-(dibutylamino) ethyl thioester;
Diphenylamine-N-carboxylic acid β-(1'-methyl piperidyl-2') ethyl thioester;
Dicyclohexylamine-N-carboxylic acid 4-(dipropylamino) butyl thioester;
Dipyridylamine-N-carboxylic acid (N' - ethyl-N'-cyclopentyl-amino) methyl thioester;
N-methyl-N-cyclopentylamine-N-carboxylic acid γ-(dicyclohexylamino)-propyl thioester;
Diethylamine-N-carboxylic acid β-(N'-pyrrolidino) ethyl thioester;
Dipyridylamine-N-carboxylic acid 4-(2'-piperazino) butyl thioester;
N-butyl-N-ethoxy phenylamine-N-carboxylic acid β-(N'-piperazino) propyl thioester;
N-propyl-N-butyl phenylamine-N-carboxylic acid β-(2'-morpholino) butyl thioester;
Dimethylamine-N-carboxylic acid (2-oxazolidino) methyl thioester;
4,4'-dichlorophenylamine-N-carboxylic acid β-(N'-oxazidino) propyl thioester;
4,4'-dibutylphenylamine-N-carboxylic acid (N'-thiazolidino) methyl thioester.

Due to the favorable chemical nature of these compounds, they possess extremely useful phytotoxic and/or phytocidal properties which enable the same to be applied for the control of water plants in moving or stagnant waters, especially in formulations or preparations with a carrier vehicle, such as where the active compound is present in an amount substantially between about 0.1–95% by weight of the mixture with the carrier vehicle, the particular thioester being present, of course, in at least a phytotoxic amount. Advantageously, in accordance with the present invention, all that is needed is a phytotoxic amount of the particular thioester in the preparation to effect the desired killing of the weeds.

In accordance with the present invention, therefore, compounds such as 4-isopropyl-diphenylamine-N-carboxylic acid β-(dimethylamino) propyl thioester having the formula

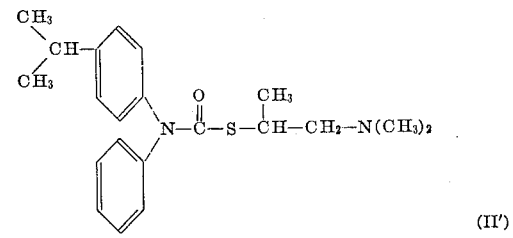

(II')

and the corresponding acid addition salts thereof, may now be provided.

Generally, phytotoxic preparations are advantageously possible, in accordance with the present invention, which may comprise a mixture of a carrier vehicle with a phytotoxic amount of a member selected from the group consisting of carbamic acid thioesters of the formula

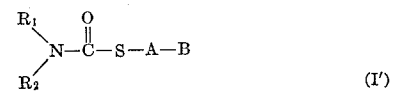

(I')

in which $R_1$ and $R_2$ each represents a member selected from the group consisting of alkyl containing 1–6 carbon atoms inclusive, cycloalkyl containing 5–6 ring carbon atoms, pyridyl, phenyl, halophenyl, alkylphenyl containing 1–4 carbon atoms inclusive in the alkyl chain, alkoxyphenyl containing 1–4 carbon atoms inclusive in the alkoxy chain; A represents alkylene having 1–4 carbon atoms inclusive; and B represents a member selected from the group consisting of N,N-dialkylamino containing 1–4 carbon atoms inclusive in each alkyl chain, N,N-dicycloalkylamino containing 5–6 ring carbon atoms in each cycloalkyl chain, N-alkyl-N-cycloalkylamino containing 1–4 carbon atoms inclusive in the alkyl chain and 5–6 ring carbon atoms in the cycloalkyl chain, saturated heterocyclic radicals containing ring nitrogen and having from 5–6 ring members which are linked to said alkylene radical A by a carbon-nitrogen bond, and saturated heterocyclic radicals containing ring nitrogen and having from 5–6 ring members which are linked to said alkylene radical A by a carbon-carbon bond; and the corresponding acid addition salts thereof.

In this connection, the present invention also contemplates a method of destroying water plants which comprises applying to such water plants by introducing into the vicinal water in which such plants are located a phytotoxic amount of a particular carbamic acid thioester of the instant type. Such thioester may be used in a concentration of substantially from about 0.1 to 100 parts by weight per million parts of water, and preferably in an amount of substantially from about 1 to 50 p.p.m.

In accordance with the foregoing, it will be appreciated that the designations $R_1$ and $R_2$ in the above formula each represents alkyl containing 1 to 6 carbon atoms inclusive, such as methyl, ethyl, n-propyl, iso-propyl, n-butyl, isobutyl, sec.-butyl, tert.-butyl, n-amyl, iso-amyl, n-hexyl, etc.; or cycloalkyl containing 5 to 6 ring carbon atoms, such as cyclopentyl and cyclohexyl; or pyridyl; or phenyl; or halo-phenyl, such as chloro-phenyl, bromo-phenyl, iodo-phenyl, fluoro-phenyl, and the di- and tri-halo-phenyls; or alkyl phenyl containing 1 to 4 carbon atoms inclusive in the alkyl chain, such as methylphenyl, ethylphenyl, n-propylphenyl, iso-propylphenyl, n-butylphenyl, iso-butylphenyl, sec.-butylphenyl, tert.-butylphenyl, dimethylphenyl, methylethyl phenyl, diethyl phenyl, methylpropyl phenyl, and tri-methyl phenyl; or alkoxy phenyl containing 1 to 4 carbon atoms inclusive in the alkoxy chain, such as methoxy phenyl, ethoxy phenyl, n-propoxy phenyl, iso-propoxy phenyl, n-butoxy phenyl, iso-butoxy phenyl, sec.-butoxy phenyl, tert.-butoxy phenyl, di-methoxy phenyl, methoxy-ethoxy phenyl, di-ethoxy phenyl, methoxy-propoxy phenyl, tri-methoxy phenyl, di-methoxy-ethoxy phenyl; with the proviso that $R_1$ and $R_2$ may be the same or different.

In the same way, the designation A represents alkylene having 1 to 4 carbon atoms inclusive, such as methylene, ethylene, n-propylene, iso-propylene, n-butylene, iso-butylene, sec.-butylene, and tert.-butylene.

Also, the designation B represents N,N-dialkylamino containing 1 to 4 carbon atoms inclusive in each alkyl chain, such as N,N-dimethyl-, -diethyl-, -dipropyl-, -dibutyl-, -methyl-ethyl-, -methyl-propyl- etc., -amino, in which such alkyl chains may be the same or different and may be either linear or branched; or N,N-dicycloalkylamino containing 5 to 6 ring carbon atoms in each cycloalkyl chain, such as N,N-dicyclopentyl-, -dicyclohexyl-, and -cyclopentyl- cyclohexyl- -amino; or N-alkyl-N-cycloalkyl amino containing 1 to 4 carbon atoms inclusive in the alkyl chain and 5 to 6 ring carbon atoms in the cycloalkyl chain, such as N-methyl-, -ethyl-, -propyl-, and -butyl-, -N-cyclopentyl- or -N-cyclohexyl- etc. -amino, in which such alkyl chain of the N,N-amino compound may be either linear or branched; or saturated heterocyclic radicals containing ring nitrogen and having 5 to 6 ring members which are linked to the alkylene radical A by a carbon-nitrogen bond or by a carbon-carbon bond, such as pyrrolidino, piperidino, piperazino, morpholino, oxazolidino, oxazidino, thiazolidino, etc.; or the corresponding acid addition salts thereof.

It will be appreciated that the instant specification and examples are set forth by way of illustration and not limitation, and that various modifications and changes may be made without departing from the spirit and scope of the present invention which is to be limited only by the scope of the appended claim.

For the preparation of the acid addition salts there may be used both inorganic and organic acids. The acids are not critical as regards the herbicidal activity of the acid addition salts. As acids which may be used for the production of the acid addition salts there may be mentioned mineral acids, such as hydrochloric, sulphuric. phosphoric and nitric acids as well as organic acids, such as fatty acids, chloro fatty acids, aromatic acids as well as araliphatic acids. The organic acids may be carboxylic acids as well as sulphonic acids. Preferred representatives are for instance acetic acid, chloro-acetic acid, butyric acid, benzoic acid, oxalic acid, fumaric acid, acrylic acid, propionic acid, benzene sulphonic acid, naphthyl sulphonic acid and p-methyl benzene sulphonic acid.

What is claimed is:

1. The compound 4 - isopropyl-diphenylamine-N-carboxylic acid β-(dimethylamino) propyl thioester having the formula

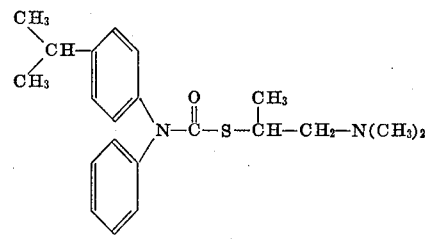

and the corresponding acid addition salts thereof.

References Cited

UNITED STATES PATENTS 2,642,451  6/1963  Weijland et al. _____ 260—455

FOREIGN PATENTS 1,150,380  6/1963  Germany.

JOSEPH P. BRUST, *Primary Examiner.*

D. PHILLIPS, *Assistant Examiner.*